(12) United States Patent
Shinyashiki et al.

(10) Patent No.: US 6,534,215 B1
(45) Date of Patent: Mar. 18, 2003

(54) SINTERED CADMIUM NEGATIVE ELECTRODE FOR ALKALINE STORAGE BATTERY AND METHOD FOR PRODUCING THEREOF

(75) Inventors: Yoshitaka Shinyashiki, Hyogo (JP); Akira Hirakawa, Sumoto (JP); Masahiro Hosoda, Hyogo (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/522,601

(22) Filed: Mar. 10, 2000

(30) Foreign Application Priority Data

Mar. 11, 1999 (JP) .............................. 11-064224

(51) Int. Cl.[7] .............................. H01M 4/80; H01M 4/44
(52) U.S. Cl. .............................. 429/222; 29/2; 29/623.1; 29/623.5; 429/223
(58) Field of Search .............................. 429/222, 94, 223; 29/623.1–623.5, 2

(56) References Cited

U.S. PATENT DOCUMENTS 5,281,495 A * 1/1994 Hirakawa et al. .............. 429/217
5,487,961 A * 1/1996 Strangways et al. .............. 429/223

FOREIGN PATENT DOCUMENTS

JP  3-48616  7/1991

* cited by examiner

*Primary Examiner*—Carol Chaney
(74) *Attorney, Agent, or Firm*—Armstrong, Westerman & Hattori, LLP

(57) ABSTRACT

The present invention discloses a sintered cadmium negative electrode for use in an alkaline storage battery having a porous sintered nickel substrate and an active material containing cadmium hydroxide, the active material impregnated in the porous sintered nickel substrate, sintered cadmium negative electrode in which a groove 3 having a depth of 0.1 to 20 $\mu$m is provided on a surface of the substrate so that a projected region and a depressed region are formed on the surface of the substrate. An alkaline storage battery employing the sintered cadmium negative electrode of the invention achieves, as well as a high capacity, an improved large current charge-discharge characteristic by increasing an oxygen gas absorbing performance.

16 Claims, 3 Drawing Sheets

SINTERED CADMIUM NEGATIVE ELECTRODE FOR ALKALINE STORAGE BATTERY AND METHOD FOR PRODUCING THEREOF

BACKGROUND OF THE INVENTION (1) Field of the Invention

The present invention relates to a sintered cadmium negative electrode for use in an alkaline storage battery wherein an active material comprising cadmium hydroxide is impregnated in a porous sintered nickel substrate, and a method for producing the sintered cadmium negative electrode.

(2) Description of the Prior Art

In recent years, needs for batteries having an increased capacity and an improved large-current charge-discharge characteristic have been growing in the market of alkaline storage batteries. To meet such needs, various techniques for improving battery performance have been suggested.

For example, as a technique for increasing battery capacity, a method of increasing an impregnating density of an active material in the negative electrode has been suggested. However, such a method increasing an impregnating density of an active material has many drawbacks such as a degradation in an oxygen gas absorbing performance and a deterioration in a charge-discharge characteristic of the negative electrode. Accordingly, it has been difficult to achieve both an increase in capacity and an improvement in battery characteristics such as an oxygen gas absorbing performance and the like.

In view of the above problems, in order to suppress the deterioration in a charge-discharge characteristic of the negative electrode, there has been suggested a technique in which a paste material composed of polyvinyl pyrrolidone (hereinafter referred to as PVP), polyvinyl alcohol (hereinafter referred to as PVA), or polysaccharide such as methylcellulose and starch is coated onto the negative electrode. However, coating such a paste material forms a layer with a low gas permeability on the surface of the electrode, and thereby induces further degradation in an oxygen gas absorbing performance.

Such a degradation in an oxygen gas absorbing performance impairs an excellent large current charge-discharge characteristic of the battery, which is a distinctive advantage in an alkaline storage battery.

The oxygen gas generated from the positive electrode in the event of overcharge is mainly consumed on the surface of the negative electrode by the oxygen gas absorbing reactions as shown below.

(A) $2Cd + O_2 + 2H_2O \rightarrow 2Cd(OH)_2$    (Chemical oxygen gas absorbing reaction)

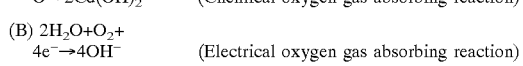
(B) $2H_2O + O_2 + 4e^- \rightarrow 4OH^-$    (Electrical oxygen gas absorbing reaction)

In order to promote such oxygen gas absorbing reactions as shown above, the following methods have been suggested.

(1) By reducing a thickness and increasing a length of the electrode plate, a surface area of the negative electrode is increased to increase a contact area of the oxygen gas and the negative electrode.

(2) As shown in Japanese Patent Publication No. 3-48616, a surface of the electrode plate is brushed with a wire brush and the sintered nickel substrate is thereby exposed, so as to promote the electrical oxygen gas absorbing reaction as shown (B) above.

However, the above-described methods (1) and (2) have the following drawbacks.

Drawbacks with Method (1) Above

When method (1) above is employed, both the chemical oxygen gas absorbing reaction shown as (A) and the electrical oxygen gas absorbing reaction shown as (B) are promoted. However, in order to reduce a thickness of the electrode plate and increase a length of the electrode plate, a relative ratio of the substrate core should inevitably be increased, thereby decreasing the amount of the impregnated active material. In addition, when this method is employed for producing a battery having a spirally-wound power-generating assembly, a diameter of the wound assembly becomes excessively large. As a consequence, method (1) has a drawback that the resulting battery capacity becomes smaller in comparison with a battery with the same size.

Drawbacks with Method (2) Above

When method (2) above is employed, a the electrical oxygen gas absorbing reaction is promoted. However, a surface area of the electrode plate cannot be increased merely by exposing the sintered nickel substrate. As a consequence, method (2) has a drawback that the resulting oxygen gas absorbing reaction as a whole is rendered insufficient.

SUMMARY OF THE INVENTION

In view of the foregoing problems and drawbacks of the prior art, it is an object of the present invention to provide a sintered cadmium negative electrode for use in an alkaline storage battery that achieves by increasing an oxygen gas absorbing performance, an improved large current charge-discharge characteristic, as well as an increased capacity.

It is another object of the present invention to provide a method for producing such a sintered cadmium negative electrode for use in an alkaline storage battery that achieves an improved large current charge-discharge characteristic, the method in which no complicated steps are required.

These and other objects are accomplished in accordance with the present invention by providing a sintered cadmium negative electrode for use in an alkaline storage battery comprising a porous sintered nickel substrate and an active material comprising cadmium hydroxide, the active material impregnated in the porous sintered nickel substrate, wherein:

a groove having a depth of 0.1 to 20 $\mu$m is provided on a surface of the substrate so that a projected region and a depressed region are provided on the surface of the substrate.

In accordance with the above-described battery construction, a surface area of the electrode plate can be increased without increasing a length of the electrode plate. Therefore, without causing a reduction in a battery capacity, the chemical oxygen gas absorbing reaction and the electrical oxygen gas absorbing reaction are promoted. Moreover, the oxygen gas absorbing performance is improved to a remarkable degree because, unlike the above-described method of exposing the sintered nickel substrate in which only the electrical oxygen gas absorbing reaction is promoted, both the chemical oxygen gas absorbing reaction and the electrical oxygen gas absorbing reaction are promoted.

The depth of the groove is restricted in the range of 0.1 to 20 $\mu$m, and this is due to the following reasons. On one hand, if the depth of the groove is made less than 0.1 $\mu$m, the resulting surface area of the electrode plate cannot be made sufficiently large, and as a consequence, the improvement in the oxygen gas absorbing performance is rendered insufficient. On the other hand, if the depth of the groove is made more than 20 μm, another problem, a degradation in a strength of the electrode plate, is induced.

In a sintered cadmium negative electrode for use in an alkaline storage battery in accordance with the invention, a polytetrafluoroethylene (PTFE) layer may be formed both on the projected region and on the depressed region.

When a PTFE layer is formed both on the depressed region and on the projected region (i.e., a PTFE layer is formed on the entire surface of the electrode plate), the adhesiveness of the PTFE is increased and thereby a three-layered interface is readily formed on the surface of the electrode plate. Therefore, the oxygen gas absorbing performance is further improved.

Further, in a sintered cadmium negative electrode for use in an alkaline storage battery in accordance with the invention, a PVP layer and/or a PVA layer may be formed on the projected region of the surface of the substrate.

Although a paste material such as PVP and PVA inhibits the oxygen gas absorbing performance, it has an advantageous function of increasing a cycle life of the battery by preventing the aggregation of cadmium caused by repeated charging and discharging. Therefore, as in the above-described construction, when a PVP layer and/or a PVA layer is/are formed only on the projected region of the electrode surface but not on the depressed region, an increase in cycle life can be achieved while a suppression of degradation in the oxygen gas absorbing performance is also achieved.

The foregoing and other objects of the present invention are also accomplished by providing a method for producing a sintered cadmium negative electrode for use in an alkaline storage battery comprising the steps of:

impregnating an active material comprising cadmium hydroxide in a porous sintered nickel substrate to produce an active material-impregnated substrate, formation-treating the active material-impregnated substrate to produce a formation-treated substrate, and forming a groove having a depth of 0.1 to 20 μm on a surface of the formation-treated substrate to produce a groove-formed substrate by brushing the formation-treated substrate with a brush so that a projected region and a depressed region are provided on a surface of the formation-treated substrate.

By employing the above-described method, a sintered cadmium negative electrode for an alkaline storage battery such as described above can be readily fabricated.

In a method for producing a sintered cadmium negative electrode for use in an alkaline storage battery in accordance with the invention, the brush may be a wire brush.

By employing a wire brush, a sintered cadmium negative electrode for an alkaline storage battery as described above can be further readily fabricated.

Further, in a method for producing a sintered cadmium negative electrode for use in an alkaline storage battery in accordance with the invention, the wire brush may have a rate of implanted wire of 5 to 10%.

By restricting a rate of implanted wire of the brush, an alkaline storage battery as described above can be further readily fabricated. A rate of implanted wire refers to a rate of an area in a wire brush on which wire is implanted to an entire area in the brush over which wire is distributed.

Further, a method for producing a sintered cadmium negative electrode for use in an alkaline storage battery in accordance with the invention may further comprise a step of forming a PTFE layer both on the projected region and on the depressed region on a surface of the groove-formed substrate by coating or impregnating PTFE on the surface of the substrate, subsequent to the step of forming a groove.

In accordance with such a method, a sintered cadmium negative electrode in which a PTFE layer is formed on the electrode plate can be readily fabricated.

Further, a method for producing a sintered cadmium negative electrode for use in an alkaline storage battery in accordance with the invention may further comprise a step of forming a PVP layer and/or a PVA layer on the surface of the formation-treated substrate by coating or impregnating PVP and/or PVA on the surface of the formation-treated substrate, subsequent to the step of formation-treating.

In accordance with the above method, a sintered cadmium negative electrode in which a PVP and/or a PVA layer is/are formed on the projected region of the electrode plate can be readily fabricated.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Now, preferred embodiments of the present invention are detailed below.

Embodiment 1

EXAMPLE 1

Figure 1:
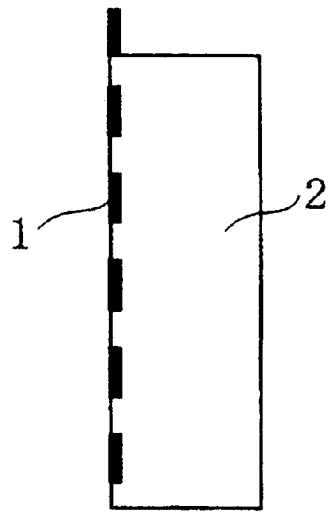
FIG. 1 a schematic view showing a formation-treated substrate used for the present invention.

A known sintered nickel substrate (porosity: about 80%) was soaked in an aqueous solution of cadmium nitrate salt, then dried, and further soaked in an alkaline aqueous solution to form cadmium hydroxide in the sintered nickel substrate. This operation for impregnating an active material was repeated, and thus an active material-impregnated substrate in which a predetermined amount of a cadmium active material was impregnated was prepared. Thereafter, the active material-impregnated substrate was formation-treated in an alkaline electrolyte solution, and partially charged to ensure a predetermined amount of preliminary charge, and thereafter washed with water and then dried. Thus, a formation-treated substrate as shown in FIG. 1 was prepared. In FIG. 1, the reference numeral 1 denotes a substrate and the reference numeral 2 denotes a sintered nickel substrate and an active material. It is noted that like reference numerals refer to like parts in FIGS. 1 through 5.

Figure 2:
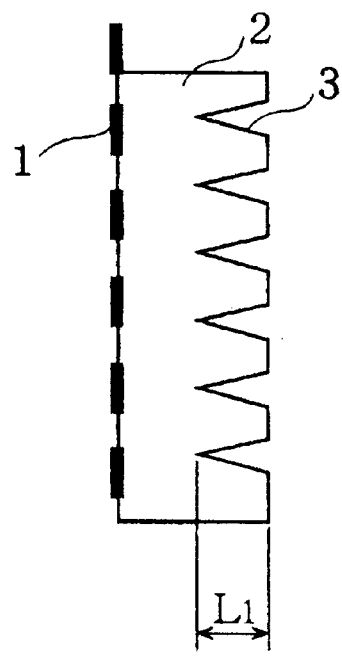
FIG. 2 a schematic view showing a negative electrode in accordance with Embodiment 1 of the present invention.
Figure 3:
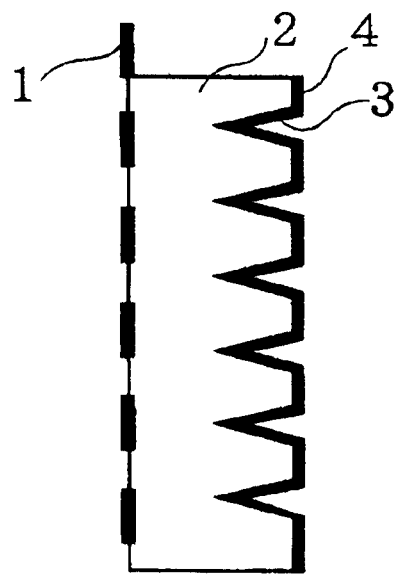
FIG. 3 a schematic view showing a negative electrode in accordance with Embodiment 2 of the present invention.

Subsequently, the formation-treated substrate was brushed with a wire brush having a rate of implanted-wire of 5–10%. Thus, a negative electrode having grooves 3 with a depth L1=1 μm, as shown in FIG. 2, was prepared. It is noted here that the depth of the grooves 3 was obtained by observing a cross section of the electrode plate with the use of an electron microscope to measure differences between topmost parts of projected regions and bottom most parts of depressed regions formed on the surface of the electrode plate, and calculating an average value of the differences.

In addition, using the foregoing negative electrode, a battery was prepared. An example of the specific method of producing the battery is as follows. The negative electrode and a known nickel positive electrode were coiled with a separator made of a nylon non-woven fabric interposed between the positive and negative electrodes, to form a power-generating element. Thereafter, the power-generating element was placed into a battery case, and an electrolyte solution was filled in the battery case. Finally, the battery case was sealed, and thus the battery was prepared. A capacity of the battery thus prepared was 1700 mAh.

The negative electrode and the battery prepared in the above manner are hereinafter referred to as a negative electrode a1 of the present invention, and a battery A1 of the present invention, respectively.

EXAMPLE 2

A negative electrode and a battery of Example 2 were prepared in the same manner as in Example 1 describe above, except that the depth of the groove L1 was made to be 0.1 μm.

The negative electrode and the battery prepared in the above manner are hereinafter referred to as a negative electrode a2 of the present invention, and a battery A2 of the present invention, respectively.

EXAMPLE 3

A negative electrode and a battery of Example 3 were prepared in the same manner as in Example 1 describe above, except that the depth of the groove L1 was made to be 20 μm.

The negative electrode and the battery prepared in the above manner are hereinafter referred to as a negative electrode a3 of the present invention, and a battery A3 of the present invention, respectively.

COMPARATIVE EXAMPLE 1

A negative electrode and a battery of Comparative Example 1 were prepared in the same manner as in Example 1 describe above, except that no groove was provided.

The negative electrode and the battery prepared in the above manner are hereinafter referred to as a comparative negative electrode x1, and a comparative battery X1, respectively.

COMPARATIVE EXAMPLE 2

A negative electrode and a battery of Comparative Example 2 were prepared in the same manner as in Example 1 describe above, except that the depth of the groove L1 was made to be 0.05 μm.

The negative electrode and the battery prepared in the above manner are hereinafter referred to as a comparative negative electrode x2, and a comparative battery X2, respectively.

COMPARATIVE EXAMPLE 3

A negative electrode and a battery of Comparative Example 3 were prepared in the same manner as in Example 1 describe above, except that the depth of the groove L1 was made to be 50 μm.

The negative electrode and the battery prepared in the above manner are hereinafter referred to as a comparative negative electrode x3, and a comparative battery X3, respectively.

Experiment 1

An internal pressure of each of the foregoing batteries A1 to A3 of the present invention and the comparative batteries X1 to X3 was measured. The result is shown in Table 1 below. The method of the measurement was as follows. Each subjected battery was charged at an electric current of 6.0 A in an atmosphere with a temperature of 25° C. The voltage was cut off at a point at which the voltage is reduced by 10 mV after a peak voltage (−ΔV method). An internal pressure was measured at a point of the peak voltage.

TABLE 1

| Battery | Depth of Groove (μm) | Battery Internal Pressure (MPa) |
| --- | --- | --- |
| Comparative Battery X1 | 0 | 1.12 |
| Comparative Battery X2 | 0.05 | 1.07 |
| Battery A2 | 0.1 | 0.68 |
| Battery A1 | 1 | 0.52 |
| Battery A3 | 20 | 0.49 |
| Comparative Battery X3 | 50 | 0.49 |

As apparent from Table 1 above, the comparative battery X1, in which no groove was provided, and the comparative battery X2, in which the depth of the groove was small, showed a large internal pressure, whereas the batteries A1 to A3 of the present invention and the comparative battery X3, in which the depth of the groove was large, exhibited a small internal pressure.

Experiment 2

A fracture rate (an electrode plate strength) of each of the foregoing negative electrodes a1 to a3 of and the comparative negative electrodes x1 to x3 was examined. The result is shown in Table 2 below. The method of the measurement was as follows. Each negative electrode was bent 90 degrees in opposite directions alternately at spaced longitudinal intervals of 1 cm so that the electrode plate was formed in a continuous W-like shape. Thereafter, a rate of a weight of the lost active material and lost sintered substrate to a weight of the negative electrode measured prior to the experiment was obtained. This rate was defined as a fracture rate herein.

TABLE 2

| Battery | Depth of Groove (μm) | Fracture Rate (%) |
| --- | --- | --- |
| Comparative Battery X1 | 0 | 0 |
| Comparative Battery X2 | 0.05 | 0 |
| Battery A2 | 0.1 | 0 |
| Battery A1 | 1 | 0 |
| Battery A3 | 20 | 0.1 |
| Comparative Battery X3 | 50 | 0.5 |

As apparent from Table 2, the comparative negative electrode x1, in which grooves formed by brushing were not provided, the comparative negative electrode x2, in which the groove was formed but the depth of the groove was small, and the negative electrodes a1 to a3, in which the depth of the groove was appropriate, showed a remarkably small fracture rate of from 0 to 0.1%, whereas the comparative negative electrode x3, in which the depth of the groove was too large, showed a high fracture rate of 0.5%. From the results of Experiments 1 and 2, it is understood that in order to improve a performance in absorbing oxygen gas without degrading an electrode plate strength, it is preferable that a groove having a depth of from 0.1 to 20 μm be provided on a surface of the electrode plate.

Embodiment 2

EXAMPLE

A negative electrode and a battery were prepared in the same manner as in the foregoing Embodiment 1 except the following. On a surface of the negative electrode shown in Example 1 of Embodiment 1, an aqueous solution in which 5.00 parts by weight of polytetrafluoroethylene (PTFE) was dissolved in 100 parts by weight of water was applied, and then dried. A PTFE layer 4 was thus formed on both projected regions and depressed regions of the surface of the electrode plate.

The battery thus prepared is hereinafter referred to as a battery B of the present invention.

COMPARATIVE EXAMPLE

A battery was prepared in the same manner as in the foregoing Example 1 of Embodiment 1, except that no brushing treatment was performed for the formation-treated substrate, and that on a surface of the formation-treated substrate, the same solution as the PTFE solution in the above Example was applied.

The battery thus prepared is hereinafter referred to as a comparative battery Y.

Experiment

An internal pressure of each of the foregoing battery B of the present invention and the comparative battery Y was measured. The result is shown in Table 3 below. The method of the measurement was the same as in the foregoing Experiment 1 in Embodiment 1.

TABLE 3

| Battery | Groove | Battery Internal Pressure (MPa) |
| --- | --- | --- |
| Battery B | Formed | 0.37 |
| Comparative Battery Y | Not formed | 0.78 |

As apparent from Table 3, the comparative battery Y, in which no groove is formed, showed a large internal pressure, whereas the battery B of the present invention exhibited a remarkably small internal pressure. It is to be noted that the battery B of the present invention exhibited a further smaller internal pressure than the foregoing battery A1, which has the same construction as the battery B except that no PTFE layer is formed. This is apparently due to the fact that an adhesiveness of PTFE was improved and an advantageous effect by PTFE, an improvement in an oxygen gas absorbing performance, was fully exhibited.

From the result, in order to further improve an oxygen gas absorbing performance, it is preferable to form a PTFE layer on a surface of the electrode plate.

Embodiment 3

EXAMPLE

Figure 4:
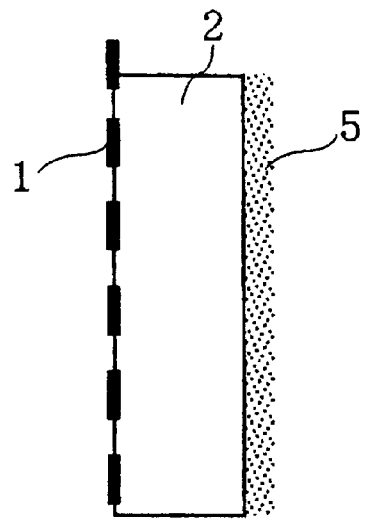
FIG. 4 a schematic view showing a state of a formation-treated substrate on which a PVA layer has been coated in accordance with Embodiment 3 of the present invention.
Figure 5:
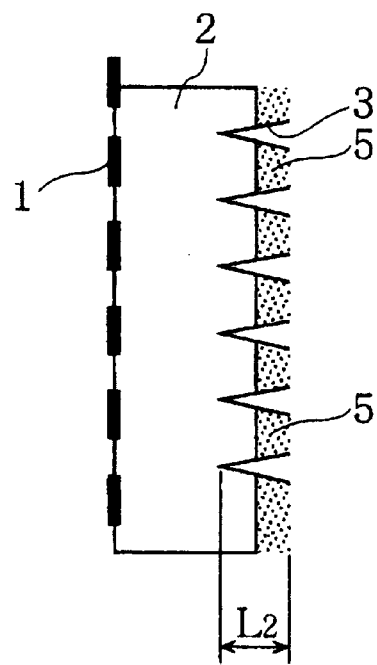
FIG. 5 a schematic view showing a negative electrode in accordance with Embodiment 3 of the present invention.

A negative electrode and a battery were prepared in the same manner as in Example 1 of Embodiment 1 except the following. On a surface of the formation-treated substrate shown in Example 1 of Embodiment 1, an aqueous solution in which 5.00 parts by weight of PVA was dissolved in 100 parts by weight of water was applied, and then dried. Thus, a PVA layer 5 was formed as shown in FIG. 4, and thereafter the substrate was brushed with a wire brush having a rate of implanted wire of 5–10% so as to form a groove 3 having a depth L2=1 μm.

The battery thus prepared is hereinafter referred to as the battery C of the present invention.

COMPARATIVE EXAMPLE

A battery was prepared in the same manner as in the above Example of Embodiment 3 except that, after the same solution shown in the above Example of Embodiment 3 was applied on a surface of the formation-treated substrate, no brushing treatment was performed to the substrate.

The battery thus prepared is hereinafter referred to as a comparative battery Z.

Experiment

An internal pressure of each of the foregoing battery C of the present invention and the comparative battery Z was measured. The result is shown in Table 4 below. The method of the measurement was the same as in the foregoing Experiment 1 in Embodiment 1.

TABLE 4

| Battery | Groove | Battery Internal Pressure (MPa) |
| --- | --- | --- |
| Battery C | Formed | 0.73 |
| Comparative Battery Z | Not formed | 1.56 |

As apparent from Table 4, the comparative battery Z, in which no groove was formed, showed a very large internal pressure, whereas the battery C of the present invention exhibited an internal pressure that is only slightly larger than that of the foregoing battery A1, which has the same construction as that of the battery C except that no PVA layer is formed.

This is apparently due to the fact that, in the comparative battery Z, the PVA layer is formed on the entire region of the negative electrode surface, and thereby an oxygen absorption reaction is greatly inhibited, whereas, in the cell C of the present invention, the PVA layer is formed on the projected region but not on the depressed region, and thereby an oxygen absorption reaction is not so inhibited.

Although it is not shown in Table 4, it was confirmed in an experiment by the present inventors that, by forming the PVA layer, a cycle characteristic of the battery C was also improved.

It is to be noted that a paste material used herein is not limited to the aforementioned PVA, but other materials, such as PVP and a mixture of PVA and PVP, may also be employed.

While preferred embodiments of the present invention have been illustrated and described in detail, it will be clear that the present invention is not so limited. Numerous modifications, changes, variations, substitutions and equivalents will occur to those skilled in the art without departing from the spirit and scope of the present invention as defined by the appended claims.

What is claimed is:

1. A sintered cadmium negative electrode for use in an alkaline storage battery comprising a porous sintered nickel substrate and an active material comprising cadmium hydroxide, said active material impregnated in said porous sintered nickel substrate, wherein:

a groove having a depth of 0.1 to 20 µm is provided on a surface of said substrate so that a projected region and a depressed region are provided on the surface of said substrate.

2. A sintered cadmium negative electrode for use in an alkaline storage battery according to claim 1, wherein a polytetrafluoroethylene layer is formed both on the projected region and on the depressed region.

3. A sintered cadmium negative electrode for use in an alkaline storage battery according to claim 1, wherein a polyvinyl pyrrolidone layer and/or a polyvinyl alcohol layer is/are formed on the projected region of the surface of said substrate.

4. A sintered cadmium negative electrode for use in an alkaline storage battery according to claim 2, wherein a polyvinyl pyrrolidone layer and/or a polyvinyl alcohol layer is/are formed on the projected region of the surface of said substrate.

5. A method for producing a sintered cadmium negative electrode for use in an alkaline storage battery comprising the steps of:

impregnating an active material comprising cadmium hydroxide in a porous sintered nickel substrate to produce an active material-impregnated substrate, formation-treating said active material-impregnated substrate to produce a formation-treated substrate, and forming a groove having a depth of 0.1 to 20 µm on a surface of said formation-treated substrate to produce a groove-formed substrate by brushing said formation-treated substrate with a brush, so that a projected region and a depressed region are provided on a surface of said formation-treated substrate.

6. A method for producing a sintered cadmium negative electrode for use in an alkaline storage battery according to claim 5, wherein said brush is a wire brush.

7. A method for producing a sintered cadmium negative electrode for use in an alkaline storage battery according to claim 6, wherein said wire brush has a rate of implanted wire of 5 to 10%.

8. A method for producing a sintered cadmium negative electrode for use in an alkaline storage battery according to claim 5, further comprising:

a step of forming a polytetrafluoroethylene layer both on the projected region and on the depressed region on a surface of said groove-formed substrate by coating or impregnating polytetrafluoroethylene on the surface of said substrate, subsequent to said step of forming a groove.

9. A method for producing a sintered cadmium negative electrode for use in an alkaline storage battery according to claim 6, further comprising:

a step of forming a polytetrafluoroethylene layer both on the projected region and on the depressed region on a surface of said groove-formed substrate by coating or impregnating polytetrafluoroethylene on the surface of said substrate, subsequent to said step of forming a groove.

10. A method for producing a sintered cadmium negative electrode for use in an alkaline storage battery according to claim 7, further comprising:

a step of forming a polytetrafluoroethylene layer both on the projected region and on the depressed region on a surface of said groove-formed substrate by coating or impregnating polytetrafluoroethylene on the surface of said substrate, subsequent to said step of forming a groove.

11. A method for producing a sintered cadmium negative electrode for use in an alkaline storage battery according to claim 5, further comprising:

a step of forming a polyvinyl pyrrolidone layer and/or a polyvinyl alcohol layer on the surface of said formation-treated substrate by coating or impregnating polyvinyl pyrrolidone and/or polyvinyl alcohol on the surface of said formation-treated substrate, subsequent to said step of formation-treating.

12. A method for producing a sintered cadmium negative electrode for use in an alkaline storage battery according to claim 6, further comprising:

a step of forming a polyvinyl pyrrolidone layer and/or a polyvinyl alcohol layer on the surface of said formation-treated substrate by coating or impregnating polyvinyl pyrrolidone and/or polyvinyl alcohol on the surface of said formation-treated substrate, subsequent to said step of formation-treating.

13. A method for producing a sintered cadmium negative electrode for use in an alkaline storage battery according to claim 7, further comprising:

a step of forming a polyvinyl pyrrolidone layer and/or a polyvinyl alcohol layer on the surface of said formation-treated substrate by coating or impregnating polyvinyl pyrrolidone and/or polyvinyl alcohol on the surface of said formation-treated substrate, subsequent to said step of formation-treating.

14. A method for producing a sintered cadmium negative electrode for use in an alkaline storage battery according to claim 8, further comprising:

a step of forming a polyvinyl pyrrolidone layer and/or a polyvinyl alcohol layer on the surface of said formation-treated substrate by coating or impregnating polyvinyl pyrrolidone and/or polyvinyl alcohol on the surface of said formation-treated substrate, subsequent to said step of formation-treating.

15. A method for producing a sintered cadmium negative electrode for use in an alkaline storage battery according to claim 9, further comprising:

a step of forming a polyvinyl pyrrolidone layer and/or a polyvinyl alcohol layer on the surface of said formation-treated substrate by coating or impregnating polyvinyl pyrrolidone and/or polyvinyl alcohol on the surface of said formation-treated substrate, subsequent to said step of formation-treating.

16. A method for producing a sintered cadmium negative electrode for use in an alkaline storage battery according to claim 10, further comprising:

a step of forming a polyvinyl pyrrolidone layer and/or a polyvinyl alcohol layer on the surface of said formation-treated substrate by coating or impregnating polyvinyl pyrrolidone and/or polyvinyl alcohol on the surface of said formation-treated substrate, subsequent to said step of formation-treating.

* * * * *